UNITED STATES PATENT OFFICE.

CHARLES S. LOCKWOOD, OF ALBANY, NEW YORK, ASSIGNOR TO THE BONSILATE COMPANY, (LIMITED,) OF SAME PLACE.

ZINCATED BONE.

SPECIFICATION forming part of Letters Patent No. 283,796, dated August 28, 1883.

Application filed February 27, 1883. (No specimens.)

*To all whom it may concern:*

Be it known that I, CHARLES S. LOCKWOOD, a citizen of the United States, residing at Albany, in the county of Albany and State of New York, have invented certain new and useful Improvements in Zincated Bone, (Plastics;) and I do hereby declare the following to be a full, clear, and exact description of the invention, such as will enable others skilled in the art to which it appertains to make and use the same.

The invention relates to an improvement in plastic materials, and particularly to an improvement upon the material and process described in Letters Patent of the United States granted, jointly, to John W. Hyatt, John H. Stevens, and myself, December 28, 1880, and numbered 236,034. The special improvement upon the material and process described in said patent which I have made consists in the treatment of the bone-dust so as to prevent the gelatine therein from becoming soluble.

In practicing the invention I proceed as follows: In, say, forty (40) parts of water I dissolve one part of sulphate of zinc, and add to the solution thus formed, say, sixteen (16) parts of bone, horn, ivory-dust, or similar material. After the ingredients are completely dissolved, the solution is subjected to the action of what is known as a "water bath"—that is to say, the solution is placed in a vessel, and the vessel containing the solution placed in a larger vessel containing water. The temperature of the water bath is gradually raised to about 180° Fahrenheit, the material being in the meantime thoroughly stirred or agitated, so as to bring all the particles of the bone or other dust in contact with the zinc. After the bath has been raised to the required degree of temperature, the bone or other dust, which will have become "zincated," is washed with cold water, whereby the free acid will be removed. The resultant material—which I have designated "zincated bone"—is then slowly dried at a temperature of about 120° Fahrenheit, after which it will be mixed with an ammoniacal solution of shellac, consisting of about two (2) parts of shellac to, say, eight (8) parts of the zincated bone, which solution will be treated to remove the aqueous particles, leaving the zincated bone and shellac in a condition to be introduced into the dies or molds; or the zincated bone may be united in other ways with a water-repellent other than shellac, according to circumstances. The zincated bone and water-repellent having been brought together, the composition is molded in dies according to methods well understood by those skilled in the art.

I do not limit myself to the proportions herein given, nor to any particular kind or quality of bone or analogous material, nor to any particular water-repellent.

What I claim as new, and desire to secure by Letters Patent, is—

1. The use, in compositions consisting of bone or analogous materials and a water-repellent, of sulphate of zinc for the purpose of rendering the gelatine in the bone or analogous material insoluble, substantially as set forth.

2. The material herein described as zincated bone, which consists of sulphate of zinc and bone or analogous material, the free sulphuric acid being removed, substantially as set forth.

3. The process of treating bone and other analogous products herein described, which consists in, first, mixing the dust with sulphate of zinc; second, submitting the mixture thus formed to a water bath, and third, removing the free acid, substantially as set forth.

In testimony whereof I affix my signature in presence of two witnesses.

CHAS. S. LOCKWOOD.

Witnesses:
CHAS. C. GILL,
HERMAN GUSTOW.